Oct. 27, 1936. L. A. GOULD 2,058,681
TELEVISION APPARATUS AND METHOD
Filed June 16, 1932 2 Sheets-Sheet 1

Leslie A. Gould
INVENTOR
ATTORNEY

Oct. 27, 1936.  L. A. GOULD  2,058,681
TELEVISION APPARATUS AND METHOD
Filed June 16, 1932  2 Sheets-Sheet 2
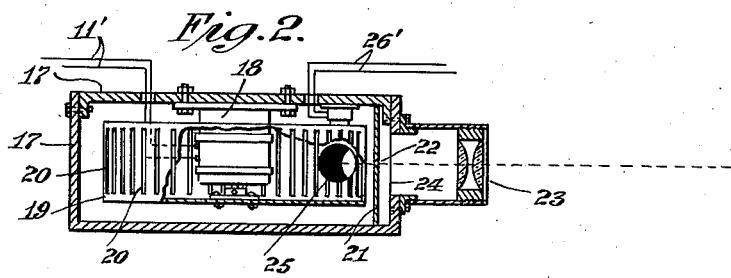
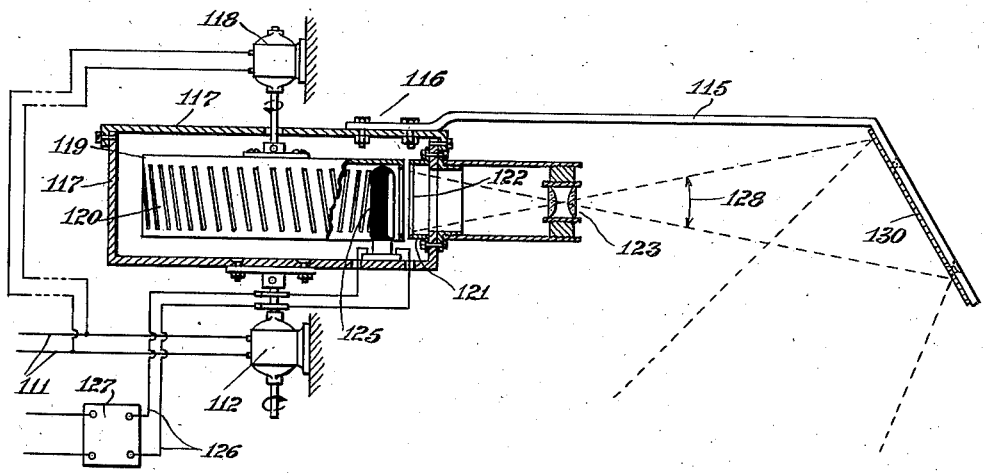
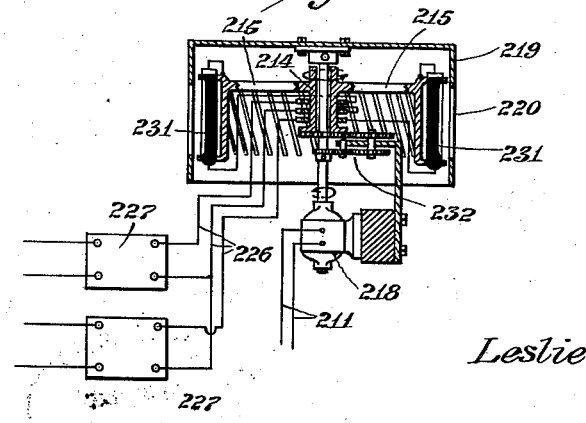
Leslie A. Gould
INVENTOR
ATTORNEY Patented Oct. 27, 1936

2,058,681

UNITED STATES PATENT OFFICE 2,058,681

TELEVISION APPARATUS AND METHOD

Leslie A. Gould, Bridgeport, Conn., assignor to Radio Inventions, Inc., New York, N. Y., a corporation of New York Application June 16, 1932, Serial No. 617,505

8 Claims. (Cl. 178—6)

The present invention is in regard to the transmission and reproduction of visual images by electrical means, and particularly the transmission and reproduction of visual scenes which embrace an extreme angle of 360° either external to a point of view or internal to a circle of view.

My invention provides a means of transmitting and reproducing certain scenes so that the reproduced images possess a substantially solid or three-dimensional appearance. This effect may be obtained by the employment of a substantially cylindrical viewing screen upon which the reproduced image is projected, or a corresponding directly-viewed receiving apparatus, together with a complementary transmitting apparatus arranged to view and scan the visual subject in a suitable manner, as will appear later in this specification. The method of my invention provides for a substantial stereoscopic effect in the reproduced image, as well as for panoramic effects of several types.

My invention is ideally suited to the transmission and reproduction of panoramic scenes or subjects similar to the subjects suitable for panoramic photographic cameras. This type of subject I term an external panorama because the scene forms an approximate circle external to the camera or transmitting apparatus, and it is desirable, when transmitting this type of scene, that the subject be disposed throughout an entire circle or 360° angle about the transmitting apparatus.

The method of my invention is also ideally suited to the transmission and reproduction of subjects whose entire outer surface it is desired to view, as from a viewing circle external to and approximately concentric with the subject. I term this type of scene an internal panorama because the subject is internal to the viewing circle of the transmitting apparatus.

In certain cases, if the subject is transmitted as an external panorama it may be received and viewed as either an external or internal panorama, while if the subject is transmitted as an internal panorama it may be received and viewed as either an internal panorama or external panorama. Usually, however, the most natural effect is obtained if the panoramic effect is of the same type at both the transmitter and the receiver.

The apparatus and method of my invention may be more fully understood by reference to the drawings forming part of this specification.

Figure 2 shows a detail elevation, partly in section, of a scanning member of the apparatus of Figure 1.

Figure 3 shows a general elevation, partly in section, of another form of the apparatus of my invention as utilized in the transmission or reception of visual images.

Figure 4 is an elevation view, partly in section, of another form of the apparatus of my invention as utilized in the reception of visual images.

Figure 1:
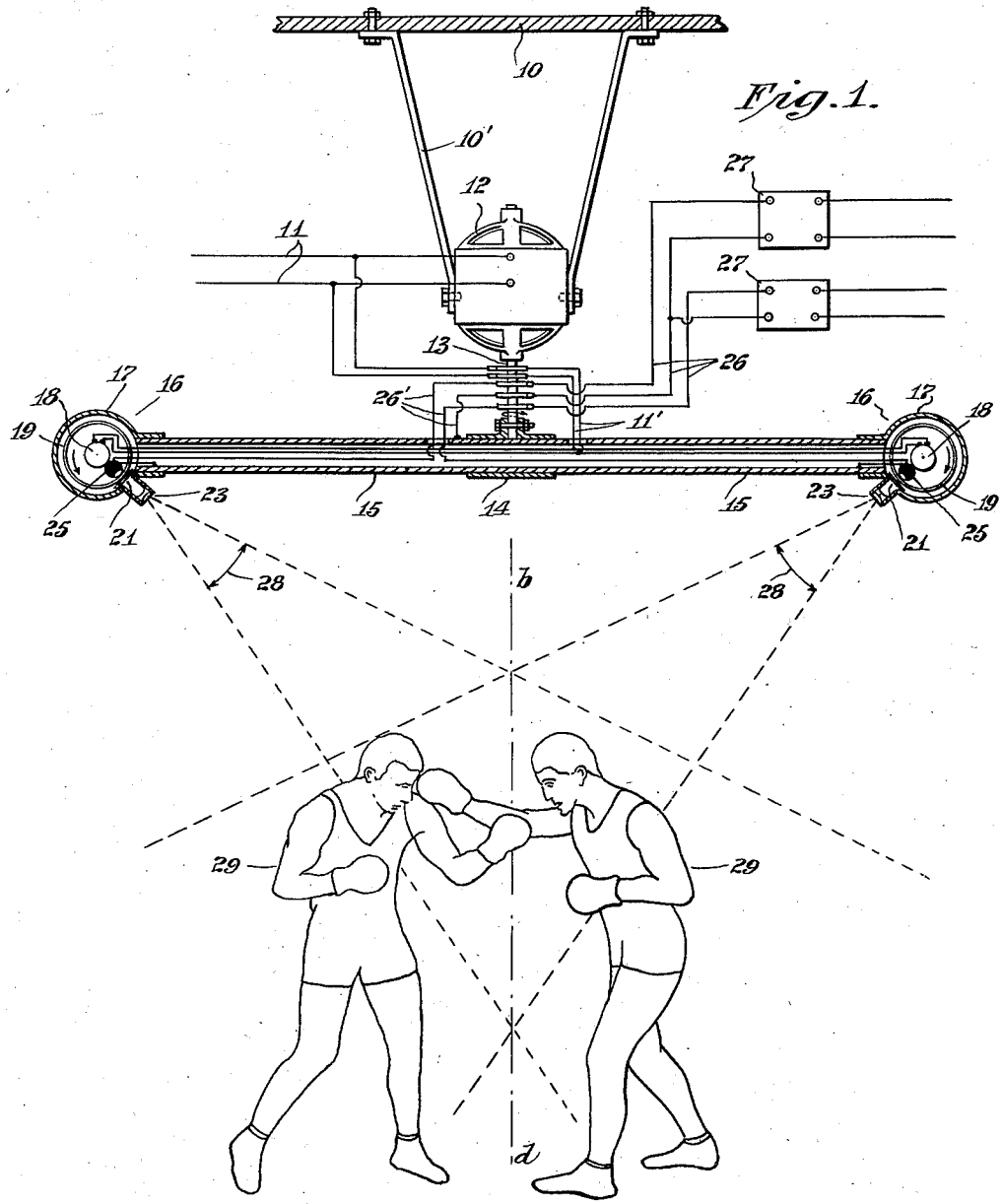
Figure 1 illustrates a general elevation, partly in section, of one form of the apparatus of my invention as utilized in the transmission or reception of visual images.

Referring to Figure 1, one form of the apparatus of my invention is shown as set up for transmitting an internal scene. A motor 12 preferably of the synchronous type, with vertical shaft 13 is supported from above, as from ceiling 10 by means of braces 10', and supplied with current through leads 11. Braces 10' may be replaced by other supporting means such as a frame with a universal joint, to allow the motor 12 to be swung to any desired angle for various subjects. To the lower end of main shaft 13 is firmly attached a clamp or sleeve 14, holding the center of a horizontal arm or bar 15. Arm 15 is preferably made of metal tube or pipe to allow insulated conductors to be carried inside, as will appear later. At each of the outer ends of arm 15 is secured a scanning head 16.

The construction of each scanning head is identical and may be better understood by reference to Fig. 2. A cylindrical or drum shaped metal housing 17 carries within it a motor 18, preferably of the synchronous type, supplied with current through leads 11', and a drum 19 is fixed upon the shaft of the motor.

The drum 19 may be provided with a plurality of equally spaced parallel slots 20 about its surface. A mask 21 may be placed close to drum 19 and provided with a narrow slot 22 whose length is perpendicular to the axis of drum 19. The mask 21 and the slots 20 may be replaced by a single circle of small holes or apertures around the drum without altering the fundamental operation of the apparatus. An objective lens 23 may be fixed before an opening 24 in housing 17 so as to cast a real optical image, of whatever is in its field of view, into the region of mask 21. Lens 23 may preferably have a relatively short focal length and large aperture, for the sake of light efficiency and depth of field, as is well known in the art. A photo-sensitive cell 25 may be placed inside of drum 19 directly behind the slot of mask 21, and secured to the housing 17.

Two leads 26′ may be brought out from the photo-sensitive device.

The two photo-sensitive cells of Figure 1 may each be connected to a separate external amplifier 27, as by means of slip rings upon main shaft 13 and stationary brushes bearing thereon, and each of motors 18 may be connected to the same source of power as is motor 12, through slip rings upon main shaft 13 and stationary brushes bearing thereon.

The relative speeds of motor 12 and a motor 18 may preferably be such that a plurality of slots on drum 19 pass before photo-sensitive cell 25 during one revolution of main shaft 13.

In this case, drum 19 operates as a line-scanning device to produce what is commonly known as a vertical line scanning, and the rotation of a scanning head 16 about the axis of main shaft 13 operates to produce horizontal field scanning. A purpose in providing two identical scanning heads 16 is to allow a reduction of one-half in the angular speed of main shaft 13, while preserving a fixed number of complete scannings per second of the visual subject. Any convenient number of such scanning heads may be used if spaced preferably equally along a circle about the axis of main shaft 13, and the angular speeds of motor 12 and motor 18 are adjusted correspondingly. However, each scanning head provided requires a separate amplifier 27 with its attendant transmitter. Single side band transmission may be used, and two amplifiers 27 may feed two transmitters operating on opposite sides of a given carrier frequency. Although the total width of frequency channels for transmission is not affected by changing the number of scanning heads 16 (assuming that the number of lines per picture and total number of pictures scanned per second are not changed), I prefer to use as small a number of scanning heads as is consistent with the size of the apparatus and its rotational speed.

For example, when two scanning heads are provided and it is desired to scan twenty pictures per second with 240 lines per picture, the speed of motor 12 may be 600 R. P. M., and the speed of a motor 18 may be 3600 R. P. M. if there are 40 slots in each drum 19.

On the other hand, the relative speed of motor 12 and each motor 18 may be such that line scanning is accomplished by the rapid movement of a scanning head about the main shaft, and field scanning is secured by the slower movement of drum slots 20 along the length of mask slot 22. In this case the result is horizontal line scanning and vertical field scanning.

The visual subject 29 in Figure 1 is shown partly within the angle of view 28 of lenses 23. That is, an image of the subject is projected by a lens 23 upon drum 19, and the vertical angle of view is determined by that part of the image which lies between two adjacent drum slots 20. The field of view may be shifted somewhat by shifting mask 21 along its slot length. The image is scanned in the direction of the slot length by the passage of drum slots 20 therealong. The resultant changing elementary light spots of the image falling upon the photo-sensitive cell cause corresponding variations in the current through the cell, and these variations are received by amplifier 27 and may be passed on to a wire line or a radio transmitter. Field scanning, which is accomplished by the movement of the optical axis of lens 23 about the axis of main shaft 13 indicated at b—d may be described approximately as the rotation of an optical plane about axis b—d, the plane containing the optical axis of the lens and moving with it.

It is preferable that the two scanning heads be in exact synchronism with one another, i. e., that if one scanning head scans a given point of the subject at a given instant, the next scanning head shall scan the same point at some time later exactly equal to the time of one complete picture scanning divided by the number of scanning heads used. This relation may be easily maintained if the motors 12 and 18 are of the synchronous type and the drums 19 are so fixed to the shafts of their respective motors that the slots 20 of all drums bear the proper spacial relation to one another.

If desired, amplifier 27 or the preliminary stages of cascade amplification thereof may be mounted at the center of the arm and rotate therewith to avoid having slip ring contacts in the circuit of the photo-sensitive devices.

A modification of the above described apparatus is shown in Figure 3, which differs from the apparatus of Figure 1 in that the scanning heads have been reduced in number to a single head, and the single head 116 has been placed at the axis of rotation of the whole apparatus. A mirror 130 on arm 115 is then secured to housing 117 so as to move in approximately the same path as did the scanning heads of Fig. 1. Light reflected from the mirror passes into the scanning head through objective lens 123.

Housing 117 may carry with it the lens 123, a mask 121 with vertical slot 122, and photosensitive device 125, and may be fixed to the shaft of a motor 112 preferably of the synchronous type. A drum 119 may be mounted upon the shaft of a motor 118, preferably of the synchronous type, and placed within housing 117 so that the drum periphery is interposed between mask 121 and photosensitive device 125. A plurality of slots 120 may be cut through the drum, each inclined so that the leading tip of any one slot falls along a vertical line containing the trailing tip of the adjacent slot. Thus, a continuous movement of a slot 120 past vertical slot 122 causes a single intersection point or area at any instant, and this point or area moves along the length of slot 122, repeating the motion each time an inclined slot 120 passes vertical slot 122. Two leads may be brought out from photosensitive device 125 to slip rings upon the shaft of motor 112 and connection made through stationary brushes to an amplifier 127. Electric current may be supplied to motors 112 and 118 from a common source 111, and the shafts of the two motors may revolve in opposite directions.

It is convenient to choose the relative angular speeds of drum 119 and housing 117 so that field scanning is accomplished in a horizontal circle and line scanning is vertical, i. e., the field scanning is governed by the rotation of housing 117 and its associated parts, while line scanning is governed by the rotation of slitted drum 119 relative to housing 117.

In the operation of the apparatus, a part of the subject must be within the angle of view 128 so that light from the subject, after reflection by mirror 130, falls upon lens 123 and is projected as an image of part of the subject upon slot 122 in mask 121. The movement of this image across slot 122 due to the rotation of housing 117 then scans the subject in one direction. Scanning in the other direction is accomplished by the movement of slots 120 past slot 122, as described heretofore.

For example, if it is desired to scan a subject twenty times per second, with 240 lines, the speed of motor 112 may be 1200 R. P. M. and the speed of motor 118 may be 1200 R. P. M. in the opposite direction, if there are 120 slots in drum 119. However, if another mirror, lens, slotted mask, and photosensitive device with slip rings and amplifier, are added to the apparatus of Figure 3, the optical elements being placed diametrically opposite to those in the figure, the speed of motor 112 may be reduced to 600 R. P. M. and the speed of motor 118 decreased to 600 R. P. M., without effectively altering the number of pictures scanned per second or the number of lines per picture.

In general, for any number of photo-sensitive devices 125 mounted at equal intervals about housing 117, with associated optical and electrical systems, the speeds of motor 112 in R. P. S. should be equal to the desired number of pictures per second divided by the number "N" of photo-sensitive devices 125. Simultaneously, the algebraic difference of the speeds of motor 112 and speeds of motor 118 in R. P. S. should be equal to the desired number of lines per second divided by the number of slots 120 in drum 119.

By using a symmetrical photo-electric cell which is responsive to illumination from a 360° angle, such a cell may be mounted in a stationary fashion at the centre of the inner drum, thus avoiding the need of slip rings and brushes. In this case the two drums co-act to give total scanning by the intersection of slot 122 with oblique slots 120. Similarly, a standard photocell may be mounted at the axis of rotation, with its light-receiving aperture facing upward or downward toward a 45° mirror or prism, said reflector rotating with the casing and diverting the beam of light through lens 123 upon the photocell regardless of the instantaneous position of the casing. Two such photocells, one above and one below the plane described by the radiation of the light beam with two corresponding 45° reflectors and two lenses and mirrors, the latter preferably 180° apart as in the form of Fig. 1, may likewise be used with a two-channel pickup generally like that of Fig. 1.

The apparatus of Figure 1 may be easily modified for scanning an external panorama by so placing the scanning heads upon the ends of arm 15 that the lenses are pointed outward toward the external subject or the scanning heads may be continuously rotatable over a wide range in a vertical plane, for selecting various subject fields. The apparatus of Figure 3 may be easily adapted to scanning an external panoramic scene by removing mirror 130 and arm 115, so that the lens views the external subject. The relative vertical position of the scanned subject field may be lowered or heightened, if desired, by placing achromatic prisms before the lens, or by the other means well known in the optical art. Thus the scanning head may be above, below, or the same height as the subject.

The apparatus of either Figure 1 or Figure 3 when arranged for either internal or external viewing may be easily adapted for receiving images which were transmitted by the methods of my invention. The only substantial modifications necessary are that each photo-sensitive device be replaced by a proper glow lamp, the visual subject be replaced by a cylindrical viewing screen, and each amplifier be replaced by an amplifier suitable for supplying a current to the respective glow lamp.

The glow lamps may be similar to those disclosed in my co-pending application, Serial Number 572,077, filed October 30, 1931, and if a plurality of glow lamps are used they may be alternate red and green lamps, as disclosed in the above application for giving color effects.

The stereoscopic effects of these receivers are partly due to the fact that the reproduced images are not identical at different horizontal points, but differ as in the case of a real three dimensional object.

Referring now to Figure 4, a receiving scanner of the directly-viewed type is shown, i. e., a receiving scanner which does not project a real optical image onto a viewing screen. In this apparatus, a drum 219 is shown provided with a plurality of equally-spaced slots 220, each inclined in a manner similar to those in drum 119 of Figure 3. Drum 219 may be fixed to one end of the shaft of motor 218, which latter is preferably of the synchronous type and is supplied with current from source 211. One or more equally spaced glow tubes 231 may be carried in a vertical position by means of arms 215 secured to a sleeve 214 which may revolve on the shaft of motor 218. The effective light source in each glow tube may be confined to a narrow vertical line or strip by means of an opaque coating on the tube, from which coating a narrow vertical strip is removed. Two leads from each glow tube may be brought out to slip rings on sleeve 214 and through stationary brushes to an amplifier 227, one amplifier being required for each glow tube. Sleeve 214 may be caused to rotate in a direction opposite to that of the shaft of motor 218 by means of a gear train 232 connecting the two.

Field scanning may be governed by the angular speed of glow tubes 231, while line scanning may be governed by the passage of slots 220 past the glow tubes. For example, if it is desired to receive an image which has been scanned by a two-channel transmitter at the rate of twenty pictures per second and 240 lines per picture, there should be two glow tubes 231 in the receiving scanner. Further, sleeve 214 may revolve at 600 R. P. M., and motor 218 may revolve at 1800 R. P. M. in the opposite direction if there are 60 slots in drum 219. The image appears at the periphery of drum 219, entirely around the drum, and occupies the cylindrical area described by the motion of drum slots 220.

The form of Fig. 4 may be modified for indirect viewing in several ways. For example, a translucent screen of cylindrical shape may be superposed about the viewing drum if desired, so that the image may be viewed thereon.

When but one tube is employed with the form of Fig. 4, this tube may be mounted in a stationary fashion at the centre of the drum, and arms 215 may carry an opaque drum with a single vertical slit as in the case of Fig. 3.

Any type of receiving scanner described above may be used for receiving images from any of the types of transmitting scanners described, whether transmitting an internal or external panoramic scene. However, if when a transmitter is scanning an internal panorama and the receiver of Figure 4 is reproducing it correctly, the transmitter shifts to an external panorama, or vice versa, the direction of rotation of the receiver motor 218 should be reversed to make the reproduced image appear right side up.

I claim:

1. In television scanners, a rotating arm, means for rotating the same so as to scan during substantially a complete circle of rotation in one direction, a photo electric cell at one end of said arm, shutter means before said cell and carried by said arm so as to rotate with it bodily, and means for moving said shutter means so as to scan in the other direction.

2. A television scanning method including the steps of rotating a light sensitive cell in a substantially complete circular path around a real three-dimensional scene to be scanned so as to scan it in one direction, and simultaneously moving a scanning shutter before said light sensitive cell so as to scan in the other direction.

3. Television scanning apparatus including an inclined mirror, means for rotating said mirror in a substantially circular path so as to embrace a field of view, a photo cell receiving light reflected from said mirror, means for moving said photo cell simultaneously with said mirror, so as to scan in one direction, obliquely slitted shutter means, and means for moving said shutter means between said photo cell and said mirror so as to scan in the other direction.

4. Television scanning apparatus including an inclined mirror, means for rotating said mirror in a substantially circular path so as to cover a panoramic field of view, shutter means having a vertical slot, means for moving said shutter means simultaneously with said mirror so as to scan in one direction, a photo cell receiving light from said mirror through said vertically slitted shutter means, additional shutter means having an oblique slit positioned between the first mentioned shutter means and the photo cell, and means for moving the second mentioned shutter means so as to scan in the other direction.

5. Television scanning apparatus comprising an arm rotatable about an axis intermediate the ends of the arm, a light-sensitive cell carried by each end of the arm, and moving shutter means associated with each cell and rotating as a unit therewith for scanning in one dimension while the arm rotates to scan in another dimension.

6. Television scanning apparatus comprising a member rotatable about a vertical axis, a light-sensitive cell carried by said member at a distance from the axis of rotation and moving shutter means associated with said cell and rotating therewith as a unit for scanning in a vertical dimension while the member rotates to cause scanning in a horizontal direction.

7. In a television system, means for scanning a scene so as to produce signals representing substantially a 360° scanning of a real three dimensional scene in one dimension, said means including means for rotating at least one scanning aperture in a path substantially circular in relation to said scene, means for unidirectionally scanning said scene in the other dimension, so as to produce signals representing said other dimension, means for transmitting said signals, means for receiving said signals including signal responsive light producing means, a receiving screen substantially cylindrical in shape and embracing substantially 360°, means for moving said light producing means in a path substantially concentric with the surface of said screen, so as to scan in one dimension, said light producing means giving effective 360° scanning response in a direction correspondent to the periphery of said screen and screening means moving between said light producing means and said screen so as to scan in the other dimension, both scanning operations coordinating with one another so as to produce upon said screen an apparent three dimensional reproduced image.

8. A method of using television scanners so as to produce panoramic three dimensional effects in television systems and the like which includes scanning a real three dimensional scene over a substantially 360° solid angle in one dimension by rotating a scanner in a path substantially circular relative to said scene, and scanning said scene for a limited extent in the other dimension, transmitting to a receiving point the signals from said scannings, separately reproducing said signals from the respective scannings and combining them so as to yield an image extending substantially 360° in one dimension and extending over a limited distance in the other dimension.

LESLIE A. GOULD.